United States Patent [19]

Smith

[11] Patent Number: 5,038,481
[45] Date of Patent: Aug. 13, 1991

[54] SABER SAW TRACKING LIGHT

[76] Inventor: Lonnie Smith, 1429 Palo Loma, Orange, Calif. 92669

[21] Appl. No.: 519,158

[22] Filed: May 4, 1990

[51] Int. Cl.$^5$ .................... B23D 49/04; B25F 3/00; B26D 7/00
[52] U.S. Cl. ........................ 30/392; 30/123; 83/520
[58] Field of Search ............... 30/392, 389, 390, 391, 30/123; 362/32, 119; 74/50; 83/520, 521, 522

[56] References Cited

U.S. PATENT DOCUMENTS

| | | | |
|---|---|---|---|
| 3,097,430 | 7/1963 | Lewinski et al. | 30/392 |
| 3,117,480 | 1/1964 | Peddinghaus | 83/520 |
| 3,504,716 | 4/1970 | Bush et al. | 30/123 |
| 4,503,740 | 3/1985 | Brand et al. | 83/520 |
| 4,833,782 | 5/1989 | Smith | 30/392 |
| 4,887,193 | 12/1989 | Diekmann | 83/520 |

Primary Examiner—Douglas D. Watts
Assistant Examiner—Paul M. Heyrana, Sr.
Attorney, Agent, or Firm—Plante, Strauss, Vanderburgh & Connors

[57] ABSTRACT

There is disclosed a tracing light for a saber saw in which the light source is located on the shoe of the saber saw, immediately adjacent the cut line marked on the work piece. In one embodiment, the light source is the terminal end of a fiber optic transmission tube which communicates with a light source mounted at another location on the saber saw. In an alternative embodiment, the light source is within a housing that is secured or supported directly on the shoe of the saber saw, with the light emitting element, either an incandescent bulb or a light emitting diode, located immediately adjacent the cut line of the work piece.

10 Claims, 2 Drawing Sheets

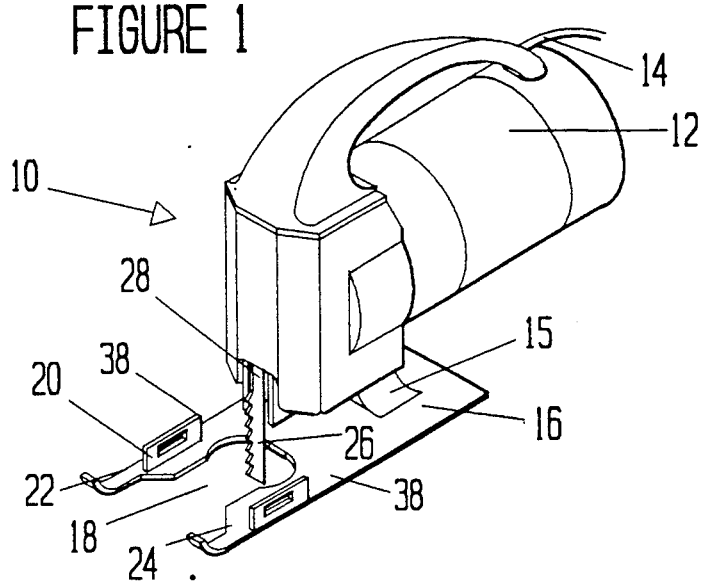
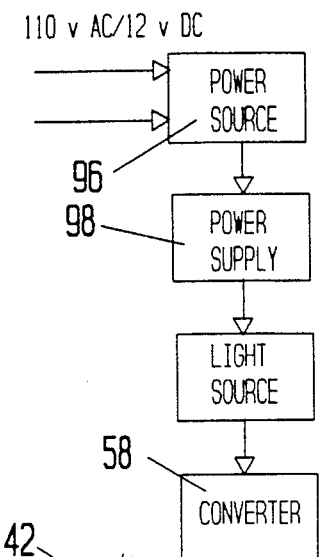
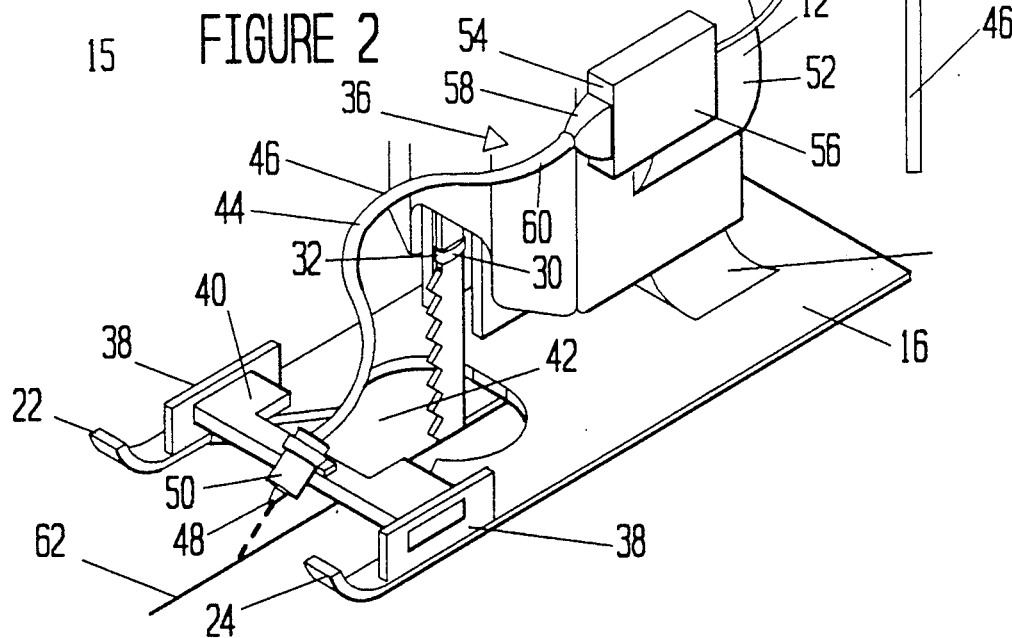

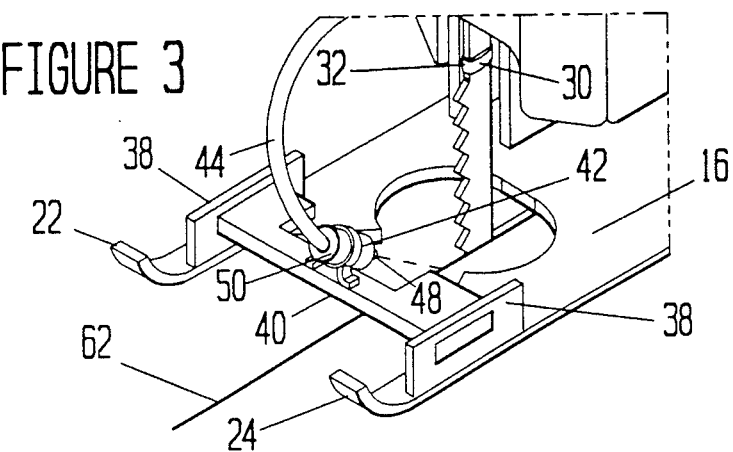
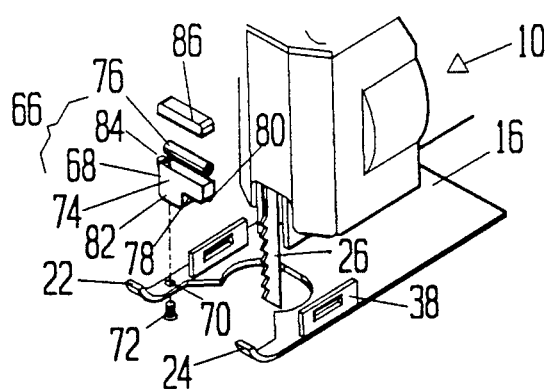
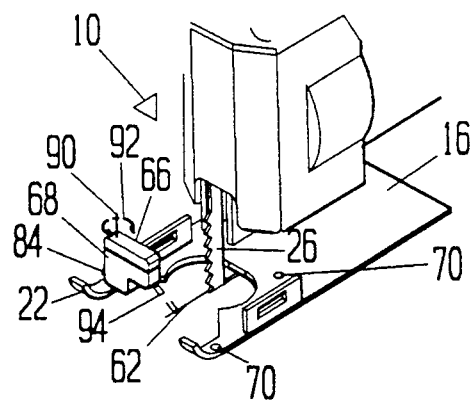

5,038,481

SABER SAW TRACKING LIGHT

BACKGROUND OF THE INVENTION

1. Field of Invention

This invention relates to a tracing light for a hand held power saw and, in particular, to a tracing light for a saber saw.

2. Brief Statement of the Prior Art

Floodlights have been used with power driven tools to illuminate the entire work surface in the vicinity of the tool such as disclosed in U.S. Pat. Nos. 2,193,878 and 2,852,051 for a router, 2,525.588 for a hand drill, 2,588,288 for hand saws, and 4,230,453 for a dentist drill.

Lights have also been used on saber saws such as shown in U.S. Pat. No. 3,393,309. U.S. Pat. No. 3,504,716 discloses an optical focusing guide for use on saber saws. While a focused beam of light has been used as a guide for a drill bit in U.S. Pat. No. 3,728,077, heretofore, there have been no prior attempts to use a narrow beam of focused light as a tracing guide for use on a saw and particularly for a portable hand saw. Instead, the prior art has concentrated on mechanical guides, fences, etc., for controlling the cutting paths of these saws.

U.S. Pat. No. 3,457,796 discloses a saber saw which has a light source 16 and a light guide of a fibre optic material which is supported on the saw housing and which terminates a substantial distance above the workpiece. U.S. Pat. No. 3,506,716 discloses a fiber optic element and magnifier to provide an improved visual guide or a sabre saw. U.S. Pat. No. 2,806,492 discloses a projector for a stationary circular saw which directs an elongated beam of light onto the cut line. U.S. Pat. No. 2,193,878 discloses a pair of flood lamps which are used to illuminate the surface of a work piece surrounding a cutting bit of a router.

OBJECTIVES OF THE INVENTION

It is an objective of this invention to provide light that will greatly facilitate scroll cutting with a hand held power saw.

It is also an object of this invention to provide a saber saw with a tracing light.

It is a further object of this invention to provide a tracing light assembly which can be added to existing saber saws.

It is an object of this invention to provide a tracing light that will provide a very high degree of precision in following a cut line with a saber saw.

Other and related objects will be apparent from the following description of the invention.

BRIEF DESCRIPTION OF THE INVENTION

This invention is a tracing light for a saber saw in which the light source is located on the shoe of the saber saw, immediately adjacent the cut line marked on the work piece.

In one embodiment, the light source is the terminal end of a fiber optic transmission tube which communicates with a light source mounted at another location on the saber saw. In an alternative embodiment, the light source is within a housing that is secured or supported directly by the shoe of the saber saw, with the light emitting element either an incandescent bulb or a light emitting diode, located immediately adjacent the cut line of the work piece.

BRIEF DESCRIPTION OF THE DRAWINGS

The invention will be described with reference to the drawings of which:

FIG. 1 illustrates a typical saber saw for use in the invention;

FIGS. 2 and 3 illustrate the saber saw of FIG. 1 with the tracing light of the invention;

FIG. 4 is an exploded view of a saber saw fitted with an alternative embodiment of the invention;

FIG. 5 is the assembly drawing of the embodiment of FIG. 3; and

FIG. 6 is a block diagram of the elements of the light source of the invention.

DESCRIPTION OF PREFERRED EMBODIMENT

Referring now to FIG. 1, a conventional saber saw 10 is illustrated. As there illustrated, the saw 10 has a housing 12 for a motor, typically an electric motor, with an electrical power supply cable 14. Alternatively, the power supply could, of course, be a battery pack. The saw has a conventional shoe 16 with a slot 18 in its leading end 20 to form runners 22 and 24 which are located on opposite sides of the blade 26. The housing 12 is supported by base 15 which is secured to the shoe 16. The runners 22 and 24 are inclined upwardly to provide ease of movement of the saw across a workpiece. Each runner is provided with a slotted bracket 38 and these brackets are commonly used to mount a flat metallic arm that supports a guide or a fence (not shown). The blade 26 is secured to a reciprocating rod 28 with suitable locking means which conventionally comprise one or more set screws 30 and a locking collar 32.

Although many manufacturers have sabre saw products on the market, these products all use the same general design and all have a supporting shoe such as element 16 with runners located on opposite sides of the blade to support and guide the saw on the workpiece.

Referring now to FIG. 2, the sabre saw 10 of FIG. 1 is modified to include a tracing light 36 of the invention. For this purpose, a support plate 40 can be mounted on the shoe 16 by inserting its opposite ends in the slotted brackets 38 of each of the runners 22 and 24. The plate 40 has a bracket 42 at its mid-point and this bracket receives the terminal end 44 of a fiber optic light tube 46. The terminal end 42 can have conventional lens 48 which is housed in a lens holder 50. Preferably, the lens holder is secured to the plate 40 at a location with the lens holder 50 and lens 48 are immediately forward of the saber saw blade and immediately adjacent to the cut line 62 that is scribed on the work piece. For accuracy, and to minimize parallax, the distance between the lens and cut line 62 should be minimal. Also, it is preferred to locate the lens as close to the blade as possible, while still retaining visibility so that the tracing light can provide maximum accuracy for scroll cutting.

When extreme accuracy is required for intricate scroll cutting, the bracket 40 can be reversed, end-to-end, resulting in the configuration shown in FIG. 3. As there illustrated, the light beam from lens 48 is directed towards the saw blade, focusing on the cut line 62 immediately in front of the blade. This eliminates all possibility for errors caused by parallax, and permits a very accurate following of an intricate scroll cut.

Referring now to FIG. 2, the light source 34 of the invention is mounted on a side wall 52 of the sabre saw housing 12 by any suitable means, e.g., screw fasteners or adhesive Velcro tabs. The light source includes an incandescent bulb, or more preferably, a light emitting diode which is located adjacent to the inside of end wall 54 of the housing 56 of the light source 34. Preferably, this bulb is located immediately adjacent to the fiber optic converter 58 which is mounted on the end 60 of the fiber optic element light tube 46. The light source is provided with a suitable source of electrical power such as a self contained battery pack, or alternatively, an electrical cord 64 can be extended to the power supply for the sabre saw, e.g., to the electrical supply cable 14.

Referring now to FIG. 4, there is illustrated an alternative embodiment of the invention, which can be installed on the same sabre saw 10 as shown in FIG. 1. In this embodiment, the shoe 16 is fitted with a light source 66 which comprises a light source housing 68 that can be mounted directly on one of the forward runners 22 or 24 of the shoe 16. Preferably, the housing 68 is symmetrical about a longitudinal axis so that it can be reversed, side to side and mounted on either runner 22 or 24. This provides adjustment for left and right handed users of the saw and insures that the housing 68 can be removed from the line of sight of the user.

A mounting aperture 70 can be provided in the shoe runners 22 and 24. In some sable saws, such apertures are provided by the manufacturer, while in others the mounting only requires drilling of the necessary aperture 70. The housing 68 can be secured to the runner 22 with a flat headed screw fastener 72. Preferably the aperture 70 is tapered to permit the fastener 72 to be engaged flush with the under surface of the runner 22. The housing as illustrated has an upper compartment 74 to receive a power source such as a rechargeable or expendable battery 76, e.g., a conventional dry cell. The housing 68 has a removable cover 86 to provide access to the interior for replacement of the battery 76 and light source 80. A light source 80 such as an LED or an incandescent bulb is mounted on the under surface 78 of compartment 74. The housing 68 also has a lower compartment 82 which supports the battery and light source 80 a slight distance above the workpiece 88. The light switch 84 and any necessary electronics for the LED is mounted in this lower compartment 82.

Referring now to FIG. 5, the tracing light 66 of the invention is shown as installed on the saber saw 10. As there illustrated, the housing 68 is secured on the forward runner 22 of the shoe 16. In this mounting, the housing 68 can be pivoted about its mounting axis 90 as indicated by the double arrowhead line 92 to provide a variable distance of the light beam 94 forward of the blade 26 of the saber saw 10. The tracing light 66 can also be located at other optimum positions on the shoe of the saw. To this end, alternative apertures 70 are located on the shoe 16; one being located on the opposite runner, and the other being located on the main plate of the shoe, closely adjacent blade 26.

The invention provides for mounting of a tracing light immediately adjacent the cut line 62, utilizing the shoe 16 of the saber saw 10 for this purpose. Because the light beam 94 is located immediately adjacent the cut line 62 and immediately forward of the blade 26 of the saw 10, there is little or no parallax, and the tracing light can be used for straight line as will as scroll cutting applications. The capability to use the light source of this invention for scroll cutting is an improvement on the tracing light disclosed in my prior U.S. Pat. No. 4,833,782. Since the light source 66 can be mounted to one side of the shoe, there is substantially no obstruction to a view of the cut line and the tracing light. Also, the lens of the light is located slightly above the surface of the workpiece and out of direct contact with the workpiece, thereby avoiding wear and scratching of the lens and interference with the freedom of movement of the saw 10.

Referring now to FIG. 6, the basic elements of the light source for the invention are shown. A suitable power source 96, which can be the 110 volt alternating current used to power the saber saw, or can be a direct current rechargeable battery source from 6 to about 24 volts, is used. The electrical voltage is applied to the power supply component 98 which includes the light switch such as 84, rectifiers, transformers, all as required to supply the requisite low voltage direct current power for the particular light source. When the light source is an incandescent light, typically direct current voltages from 3 to about 12 volts are required and the power source can include a transformer and/or rectifier to provide the necessary voltage. Similarly, LED light sources could require transformers and/or rectifiers as necessary, depending upon the power source which is selected. In the embodiment shown in FIG. 2, the light bulb or LED is physically located adjacent to a fiber optic converter 58 which is simply a lens for gathering the light emitted by the light source and conveying the light into a fiber optic light tube 46. The fiber optic element is a conventional single or multiple strand fiber optic light tube which is formed of plastic which has an internal angle of reflection such that complete internal reflection occurs in the plastic elements.

At the terminal end of the light tube, a focusing lens 48 can be provided.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a hand-held power saw having a reciprocating blade with a toothed forward cutting edge and a motor housing with a housing base supported on a forward shoe which rests on said workpiece, and useful for cutting along a line scribed on a workpiece, the improvement comprising:
   a. a visible light emitting source;
   an electrical power supply for said light emitting source;
   circuit means operatively connecting said power supply to said light emitting source; and
   d. mounting means carried on said shoe of said saw at a location to position said light emitting source immediately adjacent to said workpiece, but out of direct contact therewith, and immediately forward of and adjacent to the forward cutting edge of said blade.

2. The power saw of claim 1 wherein said shoe of said saw includes a pair of forwardly extending and opposite lateral runners, and wherein said mounting means includes means to secure said light source on at least one of said runners.

3. The power saw of claim 2 wherein said light source is contained within a housing and including means to secure said housing to one of said runners.

4. The power saw of claim 3 wherein said housing includes an interior compartment for housing a light emitting diode and a power supply means including switch means in circuit therewith.

5. The power saw of claim 4 wherein said housing is mounted on one of said runners by means permitting adjustable movement of said housing to provide an adjustable control over the proximity of said light beam to the blade of said saw.

6. The power saw of claim 5 wherein said housing is mounted to one of said runners with a screw fastener permitting said housing to be rotatably adjusted about the axis of said screw fastener.

7. In a hand-held power saw having a reciprocating blade with a toothed forward cutting edge and a motor housing with a housing base supported on a forward shoe which rests on said workpiece, and wherein said forward shoe includes a pair of slotted brackets located at opposite side edges of said shoe, and useful for cutting along a line scribed on a workpiece, the improvement comprising:
 a. visible light emitting source;
 b. an electrical power supply for said light emitting source;
 c. circuit means operatively connecting said power supply to said light emitting source; and
 d. mounting means including a plate removably received in the slots of said slotted brackets of said shoe, with said light source centrally mounted on said shoe at a location to position said light emitting source immediately adjacent to said workpiece, but out of direct contact therewith, and immediately forward of and adjacent to the forward cutting edge of said blade.

8. The power saw of claim 7 wherein said light source includes a fiber optic light tube with a terminal end mounted immediately adjacent to said workpiece, but out of direct contact therewith, and which extends to a remotely located visible light emitter.

9. The power saw of claim 8 including a focusing lens on the terminal end of said light tube.

10. The power saw of claim 9 wherein said light source is symmetrical about an axis to permit it to be reversed in position, side-to-side of said saw and be located on either of said laterally located runners.

* * * * *